United States Patent [19]

Frischmann et al.

[11] Patent Number: 5,211,512

[45] Date of Patent: May 18, 1993

[54] EXPANSION ANCHOR

[75] Inventors: Albert Frischmann, Kenzingen; Paul Steurer, Teningen; Rudolf Schnabl, Herbolzheim; Manfred Rinklake, Emmendingen; Kurt Mermi, Teningen, all of Fed. Rep. of Germany

[73] Assignee: Upat GmbH & Co., Emmendingen, Fed. Rep. of Germany

[21] Appl. No.: 888,557

[22] Filed: May 26, 1992

[30] Foreign Application Priority Data

May 27, 1991 [DE] Fed. Rep. of Germany ....... 4117238

[51] Int. Cl.$^5$ .............................................. F16B 13/06
[52] U.S. Cl. ................... 405/259.4; 411/33; 411/55; 411/57; 411/60
[58] Field of Search ............. 411/32, 33, 55, 57, 411/60, 61, 69, 70; 405/259.1–259.6

[56] References Cited

U.S. PATENT DOCUMENTS

| | | | |
|---|---|---|---|
| 3,709,089 | 1/1973 | Seetaram | 411/61 |
| 4,100,834 | 7/1978 | Harris | 411/60 |
| 4,360,301 | 11/1982 | Mosberger | 411/57 |
| 4,692,076 | 9/1987 | Herb | 411/55 |
| 4,720,224 | 1/1988 | Peterken | 411/60 X |

FOREIGN PATENT DOCUMENTS

| | | |
|---|---|---|
| 2220313 | 1/1973 | Fed. Rep. of Germany . |
| 2554851 | 6/1976 | Fed. Rep. of Germany . |
| 2718147 | 11/1977 | Fed. Rep. of Germany . |
| 2720939 | 11/1977 | Fed. Rep. of Germany . |
| 2828983 | 1/1980 | Fed. Rep. of Germany . |

Primary Examiner—Dennis L. Taylor
Assistant Examiner—John Ricci
Attorney, Agent, or Firm—Baker & Daniels

[57] ABSTRACT

An expansion anchor for insertion into a cylindrical hole of a mounting substrate possesses two expansion cones with coordinated expansion rings. The expansion rings are provided with radially protruding beads extending from the rear rim up into the center area of the expansion rings. Starting at the front rim in an insertion direction, axial incisions are provided in addition to a traversing slot, which define an expansion area of the expansion rings.

13 Claims, 4 Drawing Sheets

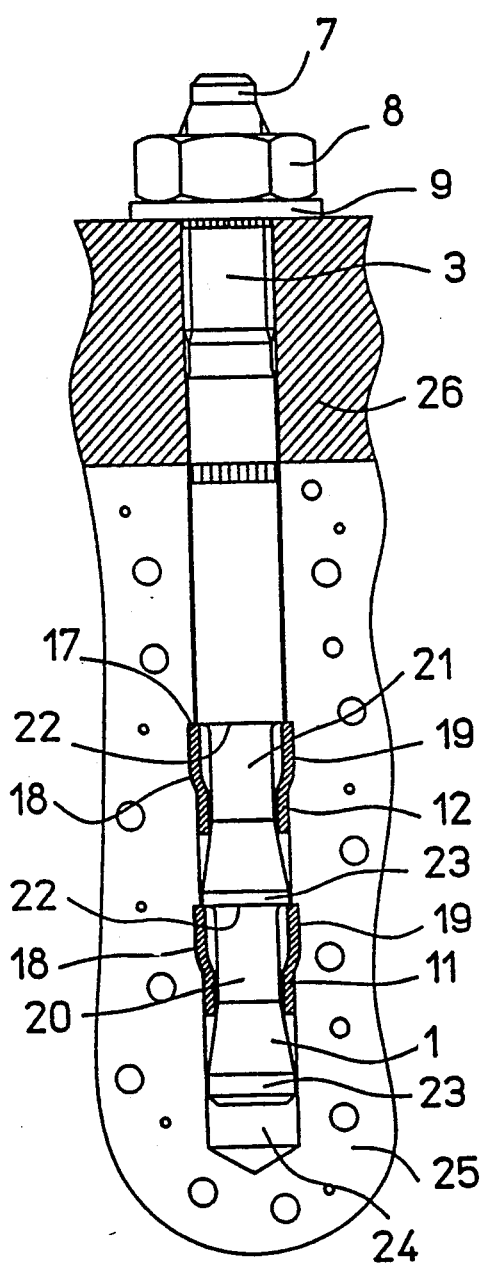
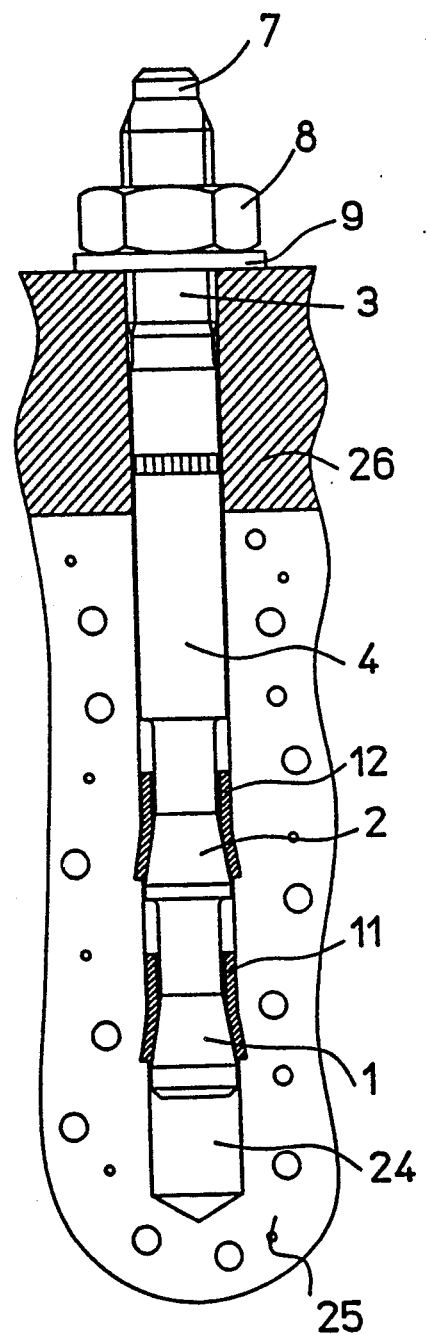
Fig. 3
Fig. 4

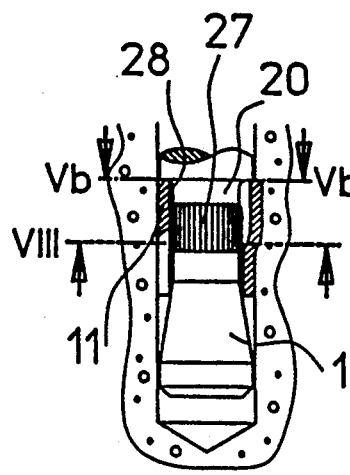
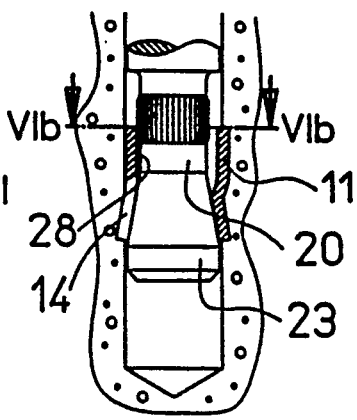
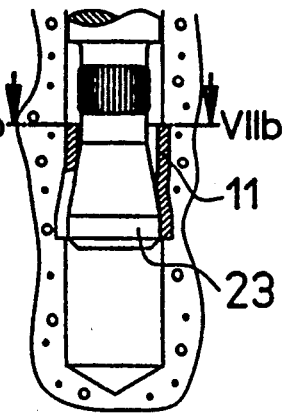
Fig. 5a  Fig. 6a  Fig. 7a
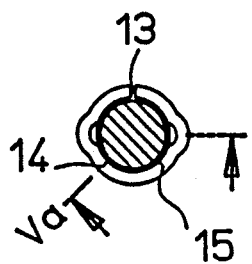
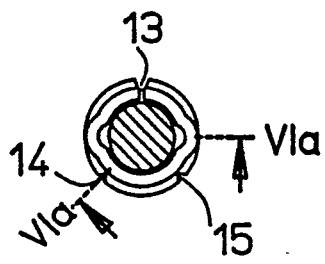
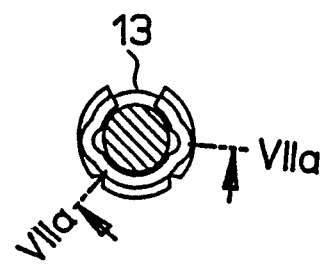
Fig. 5b  Fig. 6b  Fig. 7b
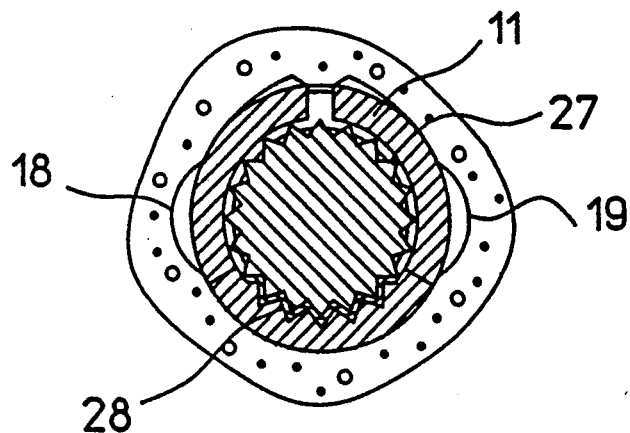
Fig. 8

EXPANSION ANCHOR

BACKGROUND OF THE INVENTION

The present invention relates to anchoring bolts and, more particularly, to an expansion anchor for insertion into a cylindrical hole of a mounting substrate.

The expansion anchor includes an anchor bolt which, on a mounting end features threading and on an insertion end an anchoring part with at least one expansion cone flaring toward the insertion end. Extending from the cone end with the smaller diameter is a cylindrical neck section defining a bearing shoulder and, on the cone end with the larger diameter is a cylindrical coating zone. Coordinated with the expansion cone is an expansion element having the shape of a sleeve type expansion ring. The expansion ring is axially slotted and features several radial projections protruding beyond the outer shell of the expansion ring and distributed along the expansion ring circumference. The inside diameter of the projections is smaller than the largest cone diameter and larger than the neck section diameter, while the outside diameter of the projections at least equals the largest diameter of the anchor bolt.

An expansion anchor of that general type is known from DE-OS 28 28 983 and allows an especially fast setting of the anchor by simply driving it into a bore hole. The anchor is subsequently fixed in the bore hole by installing a nut on the external threading of the anchor bolt extending through the object to be mounted and tightening it. This causes the anchor bolt with its expansion cones to be moved in an axial direction, the expansion rings being expanded against the wall of the hole. The radially deformed expansion rings force themselves into the mounting substrate, for instance concrete, solid brick or lime sandstone forming a depression in it. To expand the expansion ring, a force must be applied via the expansion cones. For that purpose it is necessary that the expansion ring has sufficient friction with the mounting substrate. If this is not the case during a setting operation, axial slip and imprecise setting of the anchor will result. With the expansion anchor set, if the expansion ring does not have sufficient friction with the mounting substrate the occurrence of a crack in traction zones susceptible to cracking leads to an insufficient subsequent expansion. For anchoring the expansion ring of the prior art expansion anchor, several short triangular projections are provided on the outer shell of the expansion ring, which are arranged in an axial direction in the center area of the expansion ring, tapering toward its front end. This taper results in a disuniform contact pressure and thus an unfavorable digging which, in setting the anchor, frequently causes the expansion rings of the known expansion anchor to first be subject to slipping in the axial direction, so that a fixing of the expansion ring, as the installed nut is turned, will not immediately take place, and not at the original depth and position in the hole.

Known from DD 249 072 A1 is another expansion dowel featuring spike type triangular projections provided radially outside on the expansion ring, so that these projections will prevent a concomitant rotation of the expansion ring as the anchor is tightened, thereby guaranteeing a precise setting of the dowel. But it has been demonstrated that a digging of the spike type projections into the mounting substrate is not always sufficient, especially when the hole does not have an exact diameter corresponding to the anchor size, or if irregularities are present in the hole wall.

Furthermore, owing to the serrated design of the front inner edge of the expansion ring, in the insertion direction, there exists at the start of the expansion process a risk that the points of the spikes bite into the cone, leading to a faulty and incomplete expansion unnoticed by the user. A safe and uniform anchoring is thus not given.

Another expansion anchor is known from DE-OS 27 18 147. This patent disclosure teaches an expansion anchor which is expandable on both sides and is expanded on the front end, in the insertion direction, by a cone and on the rear end by a beveled transition between the relieved neck section on which the expansion shaft is arranged and the shaft of the bolt. The expansion ring features along its circumference, axial punch-outs which are engaged by noses provided on the cone. The punch-outs reduce the peripheral surface and thus the expansion surface of the sleeve against the hole wall. Since the load capacity of an anchor, until reaching maximum load, depends upon the size of the area which, prior to the start of expansion and up to the end of the expansion process is forced on the mounting substrate, a uniform force distribution of the tractive load is not given as compared to the expansion force, due to this loss of area.

Furthermore, there is a risk that the expansion ring may unintentionally seize on the bevel as the anchor is driven in, thereby preventing a deeper penetration of the anchor in the mounting substrate.

The forced expansion of the expansion ring occurring with this device in setting the anchor causes the latter to seize on the beveled transition between shaft and neck section. Thus, on account of the resulting friction losses, a considerably greater force must be expended for the proper expansion of the sleeve as the anchor is tightened.

The expansion dowel known from DE 25 54 851 C2 features a number of axial punch-outs on the front end, relative the insertion direction, so as to keep the force necessary for expansion to a minimum, due to the relatively easy bending of the tongues separated by the punch-outs. The large number of punch-outs leads to considerable losses of area and, thus, to a disuniform introduction of the tractive load in the hole wall and to an insufficient anchoring.

DE-OS 22 20 313 teaches an anchor bolt arrangement featuring an expansion sleeve with wart type beads arranged near the rear end, relative the insertion direction, in order to thereby guarantee a stationary tightening of the anchor. To facilitate the expansion of the expansion sleeve, a second gash extending beyond the center of the sleeve is provided opposite the longitudinal gash—viewed from the front end relative the insertion direction—which second gash extends into a round opening. The far to the rear location of the pivotal point of the expansion shells proves disadvantageous as the shells can be forced into the mounting substrate only at a relatively small angle to the bolt axis, achieving a relatively low burr effect in the mounting substrate.

DE-OS 27 20 939 proposes a self-expanding dowel. The use of this device though is limited to soft materials, for example building materials of poor quality, since the blocking element provided at the bottom end forms an expansion limit in hard mounting substrates, thus preventing a complete expansion of the sleeve.

To facilitate the initial bend-out of an expansion sleeve as a cone is drawn in, DE-GM 71 00 768 provides for an expansion sleeve which features an annular groove in the immediate vicinity of the front end relative the insertion direction. Provided for rotary locking in tightening the anchor are meshing axial grooves disposed on the inside sleeve and on the cylindrical bolt section bordering on it. A second groove corresponding to the first one is fitted on the opposite end of the sleeve. With this sleeve design it has proved to be disadvantageous in that a spring effect of the sleeve caused by the grooves is responsible for the fact that the resulting wrap friction will not sufficiently guarantee the expansion and easy final expansion of the sleeve.

Based on the discussed prior art, the problem underlying the present invention is to provide an expansion anchor of the initially named type which allows a safe setting without slip, allows the application of high traction forces and a durable, safe fastening in traction zones susceptible to cracking.

SUMMARY OF THE INVENTION

This problem is inventionally solved in that the projections of the expansion ring are fashioned as outwardly arching beads which, originating from the rear rim of the expansion ring relative to the insertion direction, extend axially up to the expansion ring center, and in that—based on the front rim relative to the insertion direction—there are several incisions provided in the expansion ring which axially extend up to the center of the expansion ring.

The outwardly arched beads form a tunnel type projection which achieves favorable anchorings due to form and frictional engagement both on its front end and along its shell extending parallel to the hole wall. As opposed to the devices known from the prior art, the arching allows an elastic clamping across an axial length which approximately equals the length of the bead. Upon placement of the expansion anchor in a cylindrical hole whose diameter is about 0.5 mm greater than the diameter of the anchor bolt, the beads dig into the mounting substrate. Owing to the relatively large surface of the beaded shell which is in contact with the hole wall, a sufficiently large backing force is created so that as the expansion cone is axially retracted, the incised section of the expansion ring will expand immediately. Due to the incisions provided in addition to the expansion ring slot, only a relatively small force needs to be applied by way of the cone for deforming the sheet metal material of the expansion ring.

As opposed to the prior devices discussed above, the incisions cause no loss of area whatsoever relative to the cylindrical surface of the hole, so that a uniform force distribution of the tractive load is already guaranteed at the start of the setting operation.

An excessive axial displacement of the expansion cone relative to the expansion ring results after the expansion of the incised region of the expansion ring in a spreading of the traversing slot. This requires the expense of a greater force but leads to higher ultimate loads.

In one form thereof, two radially opposed beads are provided along with two incisions which are arranged at an offset of 120 degrees relative to the slot of the expansion ring. In the axial direction, the incisions and beads extend from opposite rims up to the center of the expansion ring which is made from sheet metal strip. Favorable elastic force conditions are given if the radius of the arching of the beads is about half as large as the radius of the expansion ring. The length of the expansion ring amounts to about 1.1 to 1.5 times the diameter of the anchor bolt and is so selected such that the expansion ring, when bearing on the shoulder on the rear end of the neck section, just touches the cone shell with its front end without being expanded. The incisions have the length of the expansion cone, so that in a specification-matched expansion there occurs merely an expansion in the incision region without causing any expansion of the traversing slot of the expansion ring.

Especially favorable setting conditions and at the occurrence of a crack in the traction zone are obtained if the expansion cone shell is coated with a lubricating agent. For an expansion cone and/or an expansion ring fabricated from refined steel it is favorable to use molybdenum sulfide as the lubricating agent, while for an expansion cone and/or expansion ring fabricated from steel, it is favorable to use wax as the lubricating agent. The lubricating agent coating makes it possible to fashion the cone angle steeper and thus shorten the anchoring section by one or several cones.

To avoid the risk of also turning the anchor bolt as the nut is turned, a rotary catch is suitably provided between the expansion ring and the anchor bolt. In one form thereof, the rotary catch is fashioned as an axial shape in a section on the inside of the expansion ring with a coordinated axial shape on the neck section.

The rotary catch allows an easy axial displacement, whereas in a peripheral direction, relative movement between the expansion and the anchor bolt is safely prevented.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 shows, in longitudinal section, the as yet unexpanded expansion anchor driven into a hole in a mounting substrate;

FIG. 4 shows the expansion anchor of FIG. 3 with the expansion rings expanded;

FIG. 5a shows the front end of the expansion anchor of FIG. 3, in side elevation, with an expansion ring sectioned along its incisions, taken along line Va—Va in FIG. 5b;

FIG. 5b shows a sectional view of the expansion anchor according to FIG. 5a taken along line Vb—Vb in FIG. 5a;

FIG. 6a is an illustration corresponding to FIG. 5a, after expansion of the expansion ring;

FIG. 6b shows a sectional view taken along line VIb—VIb according to FIG. 6a;

FIG. 7a is an illustration corresponding to FIGS. 5a and 6a showing the expansion cone drawn excessively into the expansion ring;

FIG. 7b is a sectional view taken along line VIIb—VIIb in FIG. 7a;

FIG. 8 is a cross section of the expansion anchor taken along line VIII—VIII in FIG. 5a;

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION OF THE INVENTION

Figure 1:
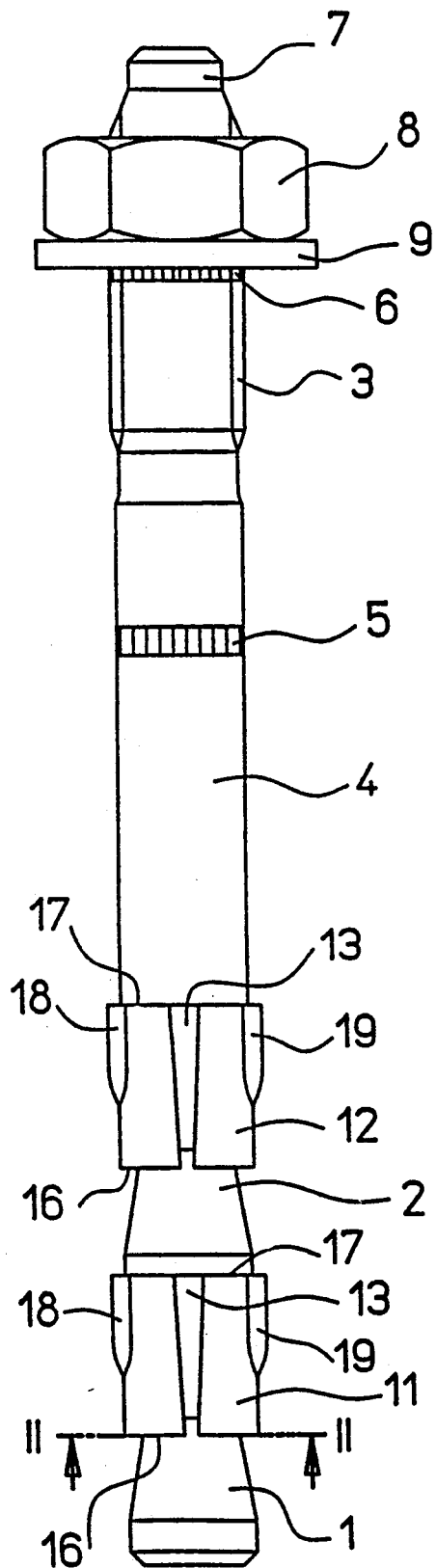
FIG. 1 shows a side elevation of an expansion anchor according to the invention.

FIG. 1 shows an embodiment of the present expansion anchor with a first expansion cone 1 and a second expansion cone 2 forming on the insertion end of the expansion anchor an anchoring part for the expansion anchor. Disposed between the anchoring part and a threaded section 3 is a smooth shaft section 4 whose diameter is about 0.5 mm smaller than the intended hole diameter. As setting aids, the expansion anchor shows a first marking 5 and a second marking 6.

Additionally, FIG. 1 shows a nut 8 screwed on the rear end 7 of the expansion anchor, relative the insertion direction, and a washer 9. Coordinated with the expansion cones 1 and 2 are expansion rings 11 and 12 made of a sheet metal strip bent into a ring with a traversing axial slot 13. In addition to the slot 13, the expansion rings 11, 12 feature two incisions 14, 15 illustrated in FIG. 2 which, starting from the front rim 16 of the expansion ring relative the insertion direction, extend in an axial direction approximately up to the center of the expansion ring.

Figure 2:
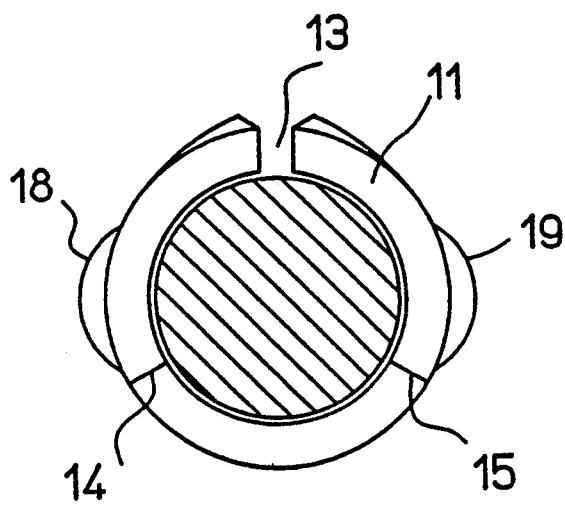
FIG. 2 is a section taken along line II—II in FIG. 1.

Starting from the rear rim 17, relative the insertion direction, there extend two relatively long beads 18, 19, see FIGS. 1 and 2, which rise above the outer shell of the shaft section 4 and allow a digging and binding of the expansion rings 11, 12 in the cylindrical hole until the expansion operation is initiated.

FIG. 3 depicts the expansion anchor of FIG. 1 after it has been driven into a cylindrical hole 24, with the expansion rings 11, 12 illustrated in longitudinal section through the beads 18, 19. Neck sections 20, 21 which extend into the rear end of the expansion cones 1, 2 feature a shoulder 22 on the end opposite the expansion cones 1, 2. Also shown in FIG. 3 are cylindrical coating zones 23 into which extend the expansion zones 1, 2 on their front end, relative the insertion direction.

As is evident from FIG. 3, the shell surfaces of the beads 18, 19 form contact areas through which the expansion rings 11, 12 obtain good contact with the hole wall with a relatively large area even before expansion. The expansion rings 11, 12 are fixed in the hole 24, for one, by frictional engagement along the shell surfaces of the beads 18 and 19 and, for another, by form fit in the area of the shoulders formed by the beads 18, 19 on the rear rim 17 of the expansion rings 11, 12.

The mounting substrate 25 illustrated in FIG. 3 is preferably a firm building material, such as solid brick, lime sandstone or concrete. The component 26 to be secured to the mounting substrate is forced, with the aid of nut 8 and washer 9, on the top side of the mounting substrate as illustrated in FIG. 3.

Following the driving phase which is illustrated in FIG. 3, the expansion phase is initiated by turning the nut 8. The expansion rings 11, 12 remain in the original, and thus intended location in the hole 24, in the fashion illustrated in FIG. 3 and 4, whereas the expansion anchor is drawn with its expansion cones 1, 2 into the expansion rings 11, 12. This causes the latter to expand in the incision area defined by the incisions 14, 15, forming in the mounting substrate 25 kerf type depressions with a conic relief. Owing to the relatively steep cone surface, the expansion ring front edge, relative the insertion direction, is forced into the mounting substrate distinctly deeper as compared to prior art devices. The expansion operation is completed once the incision area has been expanded.

FIG. 5a shows the front end of the expansion anchor according to FIG. 3 with a first or only expansion ring 11 sectioned along incisions 14, 15, for illustration of the unexpanded state of the expansion ring 11. Also visible in FIG. 5a is a neck profiling 27 which, together with an expansion ring inside profiling 28, acts as a rotational catch avoiding a rotary entrainment of the expansion anchor shaft at the start of the expansion operation as the nut 8 is screwed on.

FIG. 5b illustrates the incisions 14, 15 still closed at the start of the setting operation and the traversing slot 13.

Similar to FIG. 4, FIG. 6a shows the expansion ring 11 after the expansion operation, in which context it should be emphasized that an expansion of the expansion ring 11 takes place only in the area of the incisions 14, 15, which is illustrated in FIG. 6b as a separate view.

Based on the expansion state according to FIG. 6a, as the nut 8 is turned further it may happen that the coating zone 23 is pulled into the expansion ring 11 causing an expansion of the entire expansion ring 11 and a widening of the slot 13 in addition to the expansion of incisions 14, 15. Due to the higher expense of force required therefor, the operator is able to notice the transition to the state illustrated in FIG. 7a and 7b, due to the now greater torque.

The friction between the expansion rings 11, 12 and expansion cone 1, 2 is reduced through a lubricant coating applied on the cone shells or the insides of the expansion rings 11, 12. With an expansion cone 1, 2 or an expansion ring 11, 12 of refined steel, the lubricant coating consists preferably of molybdenum sulfide. In the case of an expansion cone 1, 2 or expansion ring 11, 12 of regular steel, the lubricant coating consists of wax. Due to the use of lubricants it may happen though that the anchor bolt is entrained as the torque is applied, so that a further expansion will no longer be possible. This is prevented by providing on the neck section 20 the neck profiling 27, which meshes with the expansion ring inside profiling 28.

FIG. 8 shows the rotary catch formed in this way in cross section.

Figure 9:
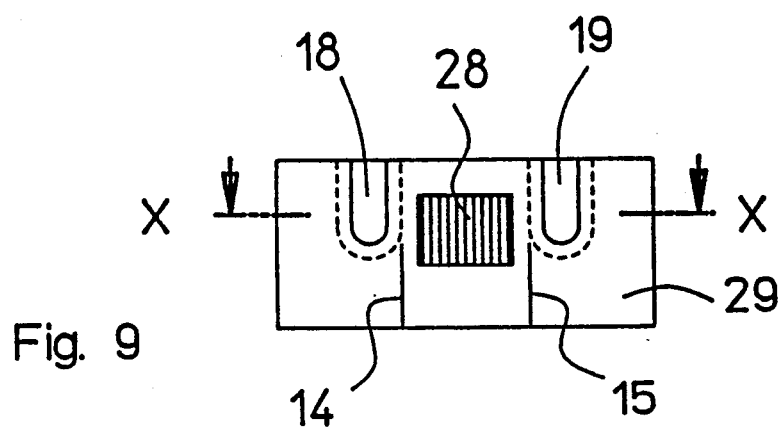
FIG. 9 is a plan view of a sheet metal strip for producing the expansion ring.

The expansion rings 11, 12 are made from sheet metal strips 29. FIG. 9 shows a plan view of such a sheet metal strip after providing the beads 18, 19 and embossing the expansion ring inside profiling 28. Also visible in FIG. 9 are the incisions 14, 15 which extend from the end of the expansion rings 11, 12 opposite the beads 18, 19 up to an imaginary center line of the expansion rings 11, 12. The lateral rims of the sheet metal strip illustrated in FIG. 9, after bending, form the edges of the slot 13.

Figure 10:
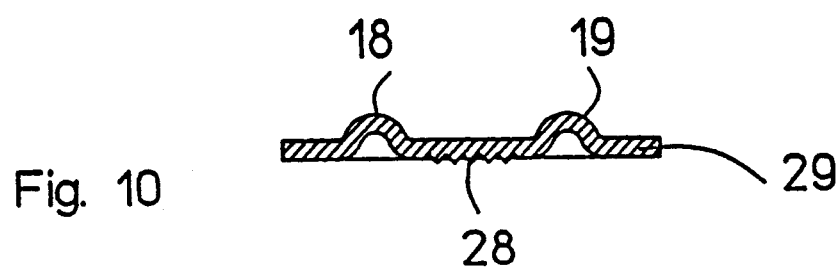
FIG. 10 shows the sheet metal strip according to FIG. 9 in a section taken along line X—X.

FIG. 10 illustrates a section through the sheet metal strip 29 and shows a cross section through the beads 18, 19, which in the axial direction of the beads 18, 19 remains substantially unchanged up to their rounded end.

Figure 11:
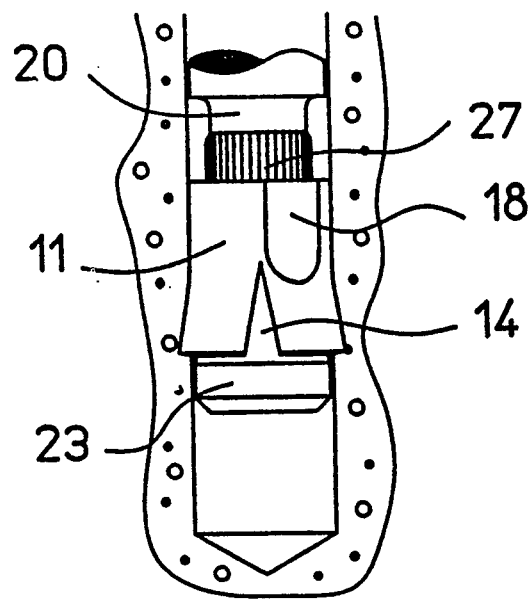
FIG. 11 shows the front end of the expansion anchor after expansion of the expansion ring, in side elevation.

FIG. 11 shows the state of expansion illustrated already in FIG. 4 and 6a, in a view illustrating an expanded incision 14 that extends up into the vicinity of the bead 18.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An expansion anchor for insertion into a cylindrical hole of a mounting substrate, the anchor comprising:
    an anchor bolt having an insertion end and a threaded mounting end;
    an anchoring part disposed on said insertion end, said anchoring part including at least one expansion cone radially flaring toward said insertion end and defining a larger diameter portion and a smaller diameter portion, a cylindrical coating zone disposed about said larger diameter portion, and a cylindrical neck section defining a shoulder disposed about said smaller diameter portion;
    an expansion element coordinated with said expansion cone and having the shape of an axially fully slotted sleeve type expansion ring and having an insertion end and an outer end;
    a plurality of radial projections protruding beyond an outer shell of said expansion ring and distributed along the expansion ring circumference, an inside diameter of said projections being smaller than the largest cone diameter and larger than a diameter of said neck section, while an outside diameter of said projections at least equals the largest diameter of said anchor bolt, said projections fashioned as outwardly arched beads axially extending from said outer end to approximately a center of said expansion ring; and
    a plurality of incisions disposed in said expansion ring, said plurality of incisions axially extending from said insertion end to approximately a center of said expansion ring.

2. The expansion anchor according to claim 1, wherein said outwardly arched beads are two radially opposed beads, and said plurality of incisions are two incisions which are each peripherally offset by 120° relative to said slot of said expansion ring.

3. The expansion anchor according to claim 1, wherein said plurality of incisions axially extend to said beads.

4. The expansion anchor according to claim 1, wherein a radius of said bead is about half as large as a radius of said expansion ring.

5. The expansion anchor according to claim 1, wherein the length of said expansion ring amounts to about 1.1 to 1.5 times the diameter of said expansion bolt.

6. The expansion anchor according to claim 1, wherein the length of said incisions equals the length of said expansion cone shell in an axial direction.

7. The expansion anchor according to claim 1, wherein the length of said neck section of said expansion cone equals about the length of said expansion ring.

8. The expansion anchor according to claim 1, wherein at least one of said expansion cone shell and the inside of said expansion rings are coated with a lubricant.

9. The expansion anchor according to claim 8, wherein said lubricant is molybdenum sulfide.

10. The expansion anchor according to claim 8, wherein said lubricant is wax.

11. The expansion anchor according to claim 8, wherein the cone flare angle amounts to 8-12 degrees.

12. The expansion anchor according to claim 8, wherein the cone flare angle is 10 degrees.

13. The expansion anchor according to claim 1, wherein said neck section includes axial profiling which meshes with a profiling provided on the inside of said expansion ring to form a rotary catch.

* * * * *